United States Patent
Wang

(10) Patent No.: US 11,221,714 B2
(45) Date of Patent: Jan. 11, 2022

(54) TOUCH CONTROL DISPLAY SUBSTRATE AND TOUCH CONTROL DISPLAY METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Zhiyong Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 806 days.

(21) Appl. No.: 16/067,321

(22) PCT Filed: Oct. 9, 2017

(86) PCT No.: PCT/CN2017/105357
§ 371 (c)(1),
(2) Date: Jun. 29, 2018

(87) PCT Pub. No.: WO2018/149155
PCT Pub. Date: Aug. 23, 2018

(65) Prior Publication Data
US 2021/0208762 A1    Jul. 8, 2021

(30) Foreign Application Priority Data
Feb. 20, 2017  (CN) .................. 201710089894.X

(51) Int. Cl.
*G06F 3/044*    (2006.01)
*G06F 3/041*    (2006.01)

(52) U.S. Cl.
CPC ............ *G06F 3/044* (2013.01); *G06F 3/0412* (2013.01); *G06F 3/04164* (2019.05); *G06F 3/04166* (2019.05)

(58) Field of Classification Search
CPC combination set(s) only.
See application file for complete search history.

(56) References Cited

U.S. PATENT DOCUMENTS

2007/0063990 A1    3/2007   Park et al.
2007/0285365 A1   12/2007   Lee
(Continued)

FOREIGN PATENT DOCUMENTS

CN    103309486 A    9/2013
CN    103376578 A   10/2013
(Continued)

OTHER PUBLICATIONS

First Office Action dated Feb. 3, 2019 corresponding to Chinese application No. 201710089894.X.
(Continued)

*Primary Examiner* — Robin J Mishler
(74) *Attorney, Agent, or Firm* — Nath, Goldberg & Meyer; Joshua B. Goldberg

(57) ABSTRACT

A touch control display substrate and a touch control display method are provided. The touch control display method includes steps of: providing data voltages to pixel electrodes, respectively, by progressive scanning; detecting actual response values of the pixel electrodes while the data voltages are provided to the pixel electrodes; and comparing the actual response values with respective standard response values, to determine whether a touch has occurred.

13 Claims, 3 Drawing Sheets

(56) References Cited

U.S. PATENT DOCUMENTS

| | | | |
|---|---|---|---|
| 2008/0309627 A1 | 12/2008 | Hotelling et al. | |
| 2010/0060600 A1* | 3/2010 | Wang .................... | G06F 3/0447 345/173 |
| 2016/0098116 A1* | 4/2016 | Park ...................... | G06F 3/0443 345/174 |
| 2018/0018052 A1* | 1/2018 | Yang .................... | G06F 3/0412 |

FOREIGN PATENT DOCUMENTS

| | | |
|---|---|---|
| CN | 103518181 A | 1/2014 |
| CN | 105335010 A | 2/2016 |
| CN | 105912178 A | 8/2016 |
| CN | 106128374 A | 11/2016 |
| CN | 106354292 A | 1/2017 |
| CN | 106775131 A | 5/2017 |
| TW | 201339929 A | 10/2013 |

OTHER PUBLICATIONS

International Search Report dated Jan. 12, 2018 corresponding to application No. PCT/CN2017/105357.

* cited by examiner

TOUCH CONTROL DISPLAY SUBSTRATE AND TOUCH CONTROL DISPLAY METHOD

CROSS-REFERENCE TO RELATED APPLICATIONS

This is a National Phase Application filed under 35 U.S.C. 371 as a national stage of PCT/CN2017/105357, filed Oct. 9, 2017, an application claiming the benefit of Chinese Patent Application No. 201710089894.X, filed on Feb. 20, 2017, the contents of which are incorporated herein in their entirety by reference.

TECHNICAL FIELD

The present disclosure relates to the field of display technology, and in particular, relates to a touch control display substrate and a touch control display method.

BACKGROUND

An existing touch control display substrate (e.g., an array substrate) may function as both a touch control substrate and a display substrate, combining a touch control panel and a display panel into one panel. Thus, the thickness and the weight of a touch control display device may be reduced. An existing embedded touch control display substrate includes a plurality of pixel electrodes, and each of the plurality of pixel electrodes is connected to a plurality of touch control signal lines and a plurality of display signal lines. During a display stage, the display signal lines input a common voltage to the pixel electrodes, and the pixel electrodes function as common pixel electrodes. During a touch control stage, the touch control signal lines input a touch a control signal to the pixel electrodes and receive a feedback signal, and the pixel electrodes function as touch control pixel electrodes.

SUMMARY

Embodiments of the present disclosure provide a touch control display substrate and a touch control display method.

Some embodiments of the present disclosure provide a touch control display method, including steps of:

providing data voltages to pixel electrodes, respectively, by progressive scanning;

detecting actual response values of the pixel electrodes while the data voltages are provided to the pixel electrodes; and comparing actual response values with respective standard response values, to determine whether a touch has occurred.

In an embodiment, the actual response values include response times, and the standard response values include standard response times of the pixel electrodes when pixels corresponding to the pixel electrodes switch between grayscales corresponding to two adjacent frames of picture; and the steps of detecting actual response values of the pixel electrodes and comparing the actual response values with respective standard response values include steps of: detecting a response time of any one of the pixel electrodes for being charged to a predetermined data voltage, comparing the response time with a corresponding standard response time, and determining a touch has occurred in a case where the response time is larger than the corresponding standard response time.

In an embodiment, it is determined that a touch has occurred in a case where a difference between the response time and the corresponding standard response time is larger than a first threshold.

In an embodiment, the actual response values include response voltages to which the pixel electrodes are actually charged after being charged for a standard response time, and the standard response values include standard charged data voltages of the pixel electrodes; and the steps of detecting actual response values of the pixel electrodes and comparing the actual response values with respective standard response values include steps of: detecting a response voltage of any one of the pixel electrodes after being charged for the standard response time, comparing the response voltage with a corresponding standard charged data voltage, and determining a touch has occurred in a case where the response voltage is less than the corresponding standard charged data voltage.

In an embodiment, it is determined that a touch has occurred in a case where a difference between the corresponding standard charged data voltage and the response voltage is larger than a second threshold.

In an embodiment, the step of providing data voltages to pixel electrodes, respectively, by progressive scanning includes providing a same data voltage to all of the pixel electrodes.

In an embodiment, the standard response time of the pixel electrodes when pixels corresponding to the pixel electrodes switch between grayscales corresponding to two adjacent frames of picture is obtained by looking up a table.

Some embodiments of the present disclosure provide a touch control display substrate, including:

pixel electrodes;

a driver, configured to provide data voltages to the pixel electrodes, respectively, by progressive scanning;

a detector, configured to detect actual response values of the pixel electrodes while the driver provides the data voltages to the pixel electrodes, respectively, and compare the actual response values with respective standard response values to determine whether a touch has occurred.

In an embodiment, the touch control display substrate further includes a memory storing in advance therein the standard response values of standard response times of the pixel electrodes when pixels corresponding to the pixel electrodes switch between grayscales corresponding to two adjacent frames of picture.

Some embodiments of the present disclosure provide a touch control display panel, which includes the touch control display substrate as described above.

Some embodiments of the present disclosure provide a display device, which includes the touch control display panel as described above.

DETAILED DESCRIPTION

For better understanding of the technical solutions according to the present disclosure by one of ordinary skill in the art, the present disclosure will be further described in detail below with reference to the accompanying drawings and embodiments.

The inventor of the present disclosure has found at least the following problems present in the prior art: the touch control display substrate achieving both a display function and a touch function requires the plurality of touch control signal lines and the plurality of display signal lines, resulting in more wiring for the signal lines, more masks for manufacturing the substrate, and a more complicated manufacturing process. Further, a larger number of films stacked on the substrate will result in defects in the manufacturing process and reduction of a ratio of qualified products to all products, which is not helpful for reducing costs. Furthermore, if the touch control display device is applied to an automobile-mounted product and the like, security risks may occur.

Figure 1:
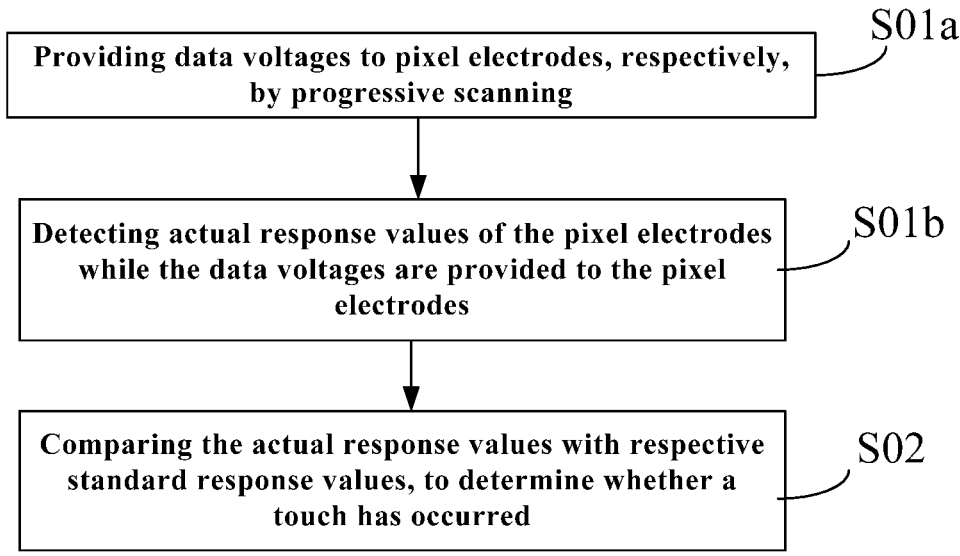
FIG. 1 is a schematic flowchart showing a touch control display method according to an embodiment of the present disclosure.

As shown in FIG. 1, an embodiment of the present disclosure provides a touch control display method. The touch control display method includes the following steps S01*a*, S01*b*, and S02.

The step S01*a* includes providing data voltages to pixel electrodes via display signal lines, respectively, by progressive scanning.

The step S01*b* includes detecting actual response values of the pixel electrodes while the data voltages are provided to the pixel electrodes.

The step S02 includes comparing the actual response values with respective standard response values to determine whether a touch has occurred.

Figure 2:
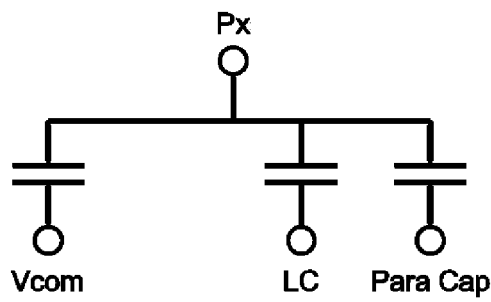
FIGS. 2 and 3 are schematic diagrams showing equivalent circuits around a certain pixel electrode Px according to an embodiment of the present disclosure.
Figure 3:
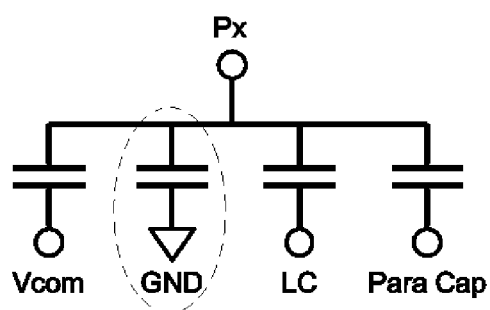

Reference to FIGS. 2 and 3 is now made. FIG. 2 is a schematic diagram showing an equivalent circuit around a certain pixel electrode Px in a non-touch state, and FIG. 3 is a schematic diagram showing an equivalent circuit around the pixel electrode Px in a touch state. Specifically, for example, in a case where the position of a certain pixel electrode Px is touched by a finger of a person, it means that a capacitance formed between the human body and the earth (as shown in the dotted line ring of FIG. 3) is connected in parallel to the equivalent circuit around the pixel electrode Px at the position. This capacitance will cause a data voltage to be supplied to the pixel electrode Px to change slowly. An actual response value of the pixel electrode Px is detected, and the actual response value is compared with a standard response value to determine whether a touch has occurred. The reference voltage Vcom, the liquid crystal capacitance LC, and the parasitic capacitance Para Cap in the figures are all known in the display principle, and detailed description thereof is omitted herein.

In the touch control display method according to the present embodiment, the function of touch control detection is realized while a data voltage is provided to the pixel electrode via the display signal line. Since each pixel can realize the function of touch control detection while displaying, an accuracy of the detection and a sampling frequency of the detection can be increased greatly, and the performance of touch control and display as a whole is improved. At the same time, it is not necessary to provide any touch control signal line for the touch control function separately, thereby reducing the production cost.

Further, an embodiment of the present disclosure provides another touch control display method. This method includes providing data voltages to pixel electrodes via display signal lines, respectively, by progressive scanning, detecting response times that the pixel electrodes are charged to the data voltages while the data voltages are provided to the pixel electrodes, and comparing the response times with the respective standard response values. Here, the standard response value may be a standard response time of a pixel electrode when a pixel corresponding to the pixel electrode switch between grayscales corresponding to two adjacent frames of picture. The touch control display method may further include determining a touch has occurred in a case where the response time is larger than the standard response time.

Figure 4:
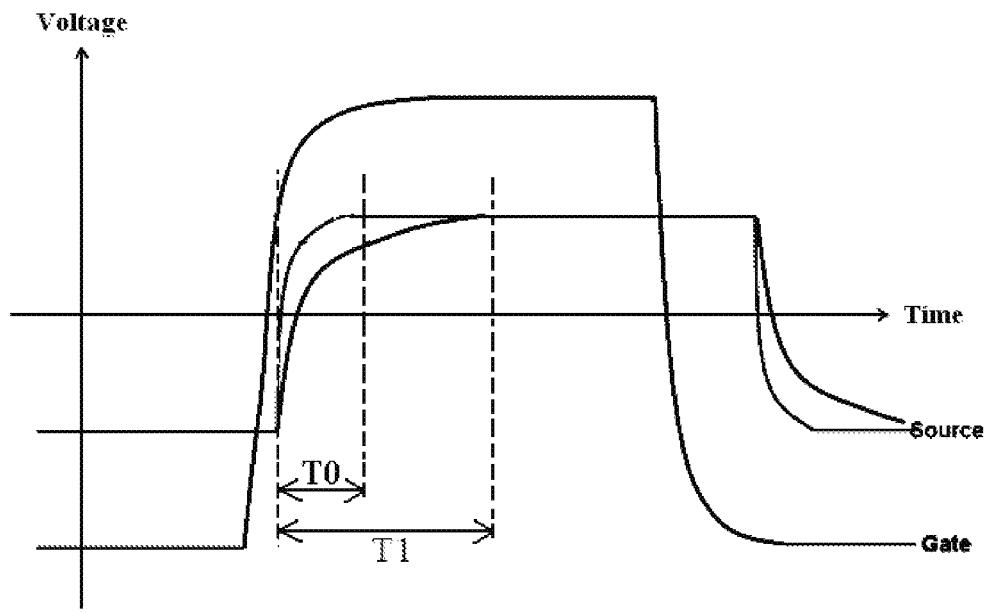
FIG. 4 illustrates schematic curves, which show a data voltage at a certain pixel electrode changing over time when the pixel electrode is charged during different detection periods, according to an embodiment of the present disclosure.
Figure 5:
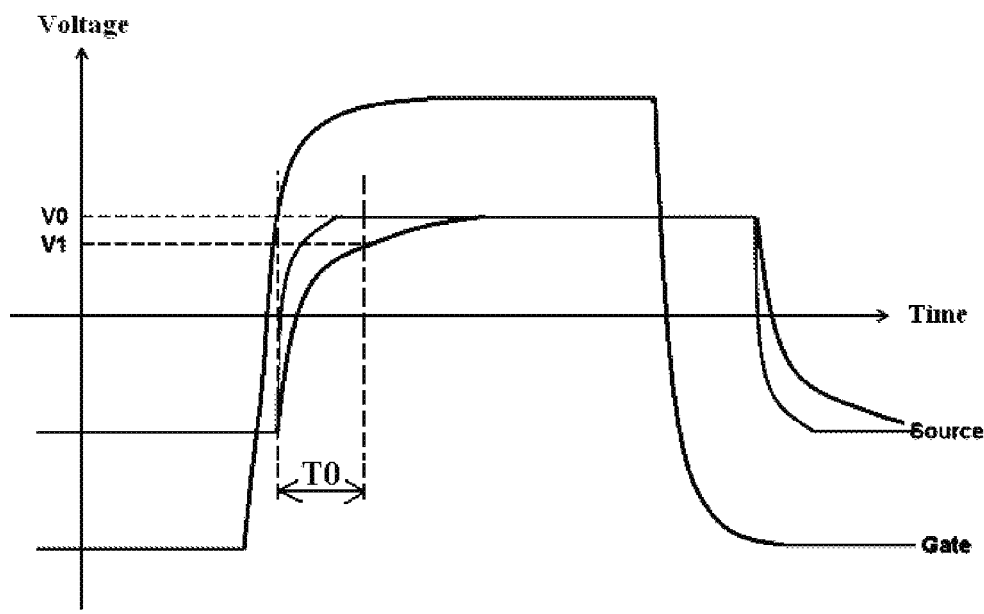
FIG. 5 illustrates schematic curves which show a data voltage at a certain pixel electrode changing over time when the pixel electrode is charged during different detection periods and a standard charged data voltage curve, according to an embodiment of the present disclosure.

That is, a time for the pixel electrodes being charged to a predetermined voltage is detected, and the time for charging is compared with the standard response time to determine whether a touch has occurred. The standard response time as described above is a time that the pixel electrode is charged to a predetermined voltage in a case where a touch does not occur. If the response time is larger than the standard response time, it is determined that a touch has occurred. Specifically, for example, in a case where a touch does not occur, the standard response time for the pixel electrode being charged to a predetermined voltage (i.e., the highest voltage at the Source as shown in FIG. 4) is T0. In a next detection period, a response time for the pixel electrode being charged to the predetermined voltage again is T1. If the pixel electrode is not touched in said next detection period, then T0 and T1 would be substantially the same. If the pixel electrode is touched in said next detection period, then T1>T0, as shown in FIG. 4. FIGS. 4 and 5 each further illustrate a curve showing the change of a voltage at a gate line or a gate.

To further increase the detection accuracy of touch control, a threshold Tm may be set in advance. In this case, if T1−T0>Tm, it is determined that a touch has occurred. Otherwise, it is determined that a touch does not occur.

In the present embodiment, by detecting the time T1 for each of pixel electrodes being actually charged to a predetermined voltage, and comparing the time T1 with the standard response time T0 to determine whether a touch has occurred, the touch control display method according to the present embodiment can be carried out conveniently and quickly.

Further, an embodiment of the present disclosure provides another touch control display method. This method includes providing data voltages to pixel electrodes via display signal lines, respectively, by progressive scanning, detecting response voltages of the pixel electrodes after being charged for the standard response times that pixels corresponding to the pixel electrodes take to switch between grayscales corresponding to two adjacent frames of picture, comparing the response voltages with respective standard charged data voltages, and determining a touch has occurred in a case where the response voltage is less than the standard charged data voltage.

That is, in a case where a touch occurs, a capacitance formed by the human body relative to the earth is connected in parallel to the pixel electrode, and thus the response voltage will be less than the standard charged data voltage. In the method, the response voltage of the pixel electrode after being charged for the standard response time is detected, and the response voltage is compared with the standard charged data voltage to determine whether a touch has occurred. Specifically, for example, in a case where a touch does not occur, the standard charged data voltage to which one of the pixel electrodes is charged for the standard response time T0 is V0. In a next detection period, a response voltage to which the pixel electrode is charged for the standard response time T0 again is V1. If the pixel electrode is not touched in said next detection period, then V0 and V1 would be substantially the same. If the pixel electrode is touched in said next detection period, then V1<V0, as shown in FIG. 5.

To further increase the detection accuracy of touch control, a threshold Vm may be set in advance. In this case, if V0−V1>Vm, it is determined that a touch has occurred. Otherwise, it is determined that a touch does not occur.

Further, an embodiment of the present disclosure provides another touch control display method. This method includes providing data voltages to pixel electrodes via display signal lines, respectively, by progressive scanning, detecting actual response values of the pixel electrodes while the data voltages are provided to the pixel electrodes, and comparing the actual response values with respective standard response values, to determine whether a touch has occurred. In the present embodiment, the step of providing data voltages to pixel electrodes via display signal lines, respectively, by progressive scanning may include providing a same data voltage to all of the pixel electrodes.

That is, voltages received by the pixel electrodes may not be the same, but may be different at every time according to grayscales of pictures to be displayed. Thus, a time for a pixel electrode to be charged to 1 v and a time for the pixel electrode to be charged to 2 v may be different. In the present embodiment, a same data voltage is provided to all of the pixel electrodes while performing a normal display, which means that a detection frame is inserted (which is a technology of black frame insertion and does not have any influence on the normal display). In the detection frame, a same predetermined data voltage is charged into all of the pixel electrodes. Thus, it may be determined whether a touch has occurred, by detecting a time for each of the pixel electrodes being charged to the predetermined data voltage in different detection periods (e.g., by detecting a response time as described in the foregoing embodiments), thereby increasing the detection accuracy greatly.

Further, an embodiment of the present disclosure provides another touch control display method. This method includes providing data voltages to pixel electrodes via display signal lines, respectively, by progressive scanning, detecting actual response values of the pixel electrodes while the data voltages are provided to the pixel electrodes, and comparing the actual response values with respective standard response values, to determine whether a touch has occurred. In the present embodiment, the standard response values which are standard response times of the pixel electrodes when pixels corresponding to the pixel electrodes switch between grayscales corresponding to two adjacent frames of picture is obtained by looking up a table.

That is, the standard response times for the pixel electrodes being charged to corresponding data voltages are detected when pixels corresponding to the pixel electrodes switch between grayscales corresponding to two adjacent frames of picture, then the standard response times are written into a lookup table, and the lookup table is stored into an integrated circuit (IC) (e.g., a memory). In a case where determination of touch control is performed by using the detection method according to the above embodiment, charging the pixel electrodes to different data voltages requires different standard response times. However, a corresponding standard response time may be selected from the lookup table to make comparison, thereby further increasing an accuracy of the detection and an efficiency of the detection.

Apparently, many variations may be made to the foregoing embodiments. For example, the standard response times may stored into the IC in different forms according to practical requirements, and a method for comparing an actual response value with a standard response value (e.g., selecting the thresholds Tm and Vm) may be adjusted according to a practical application.

Figure 6:
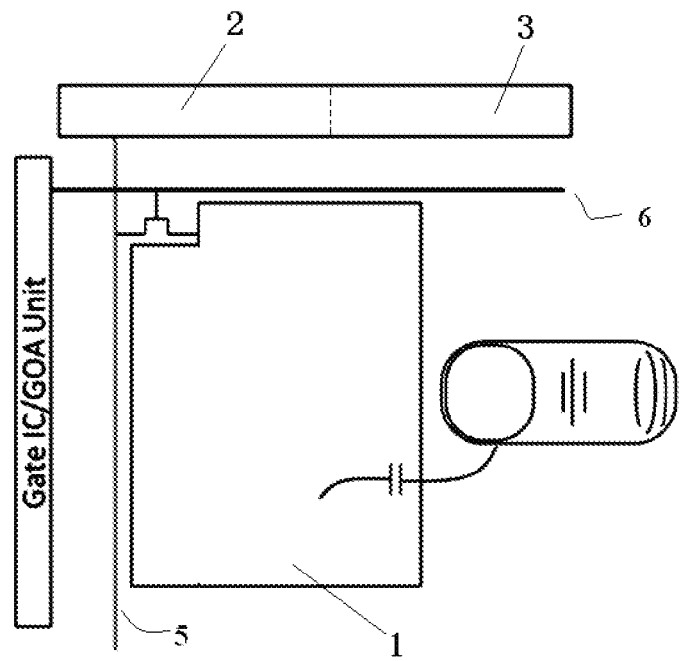
FIGS. 6 and 7 are schematic diagrams showing touch control display substrates according to embodiments of the present disclosure, respectively.

Further, an embodiment of the present disclosure provides a touch control display substrate, as shown in FIG. 6. The touch control display substrate includes pixel electrodes 1, a driver 2, a detector 3, and display signal lines (i.e., data lines) 5.

In the present embodiment, the driver 2 and the detector 3 may share a same IC. The driver 2 is configured to provide data voltages to the pixel electrodes 1 via the display signal lines (i.e., the data lines) 5, respectively, by progressive scanning. The standard charged data voltages may be data voltages on the display signal lines (i.e., the data lines) 5. The detector 3 is configured to detect actual response values of the pixel electrodes 1 while the driver 2 provides the data voltages to the pixel electrodes 1, and compare the actual response values with respective standard response values to determine whether a touch has occurred.

Figure 7:
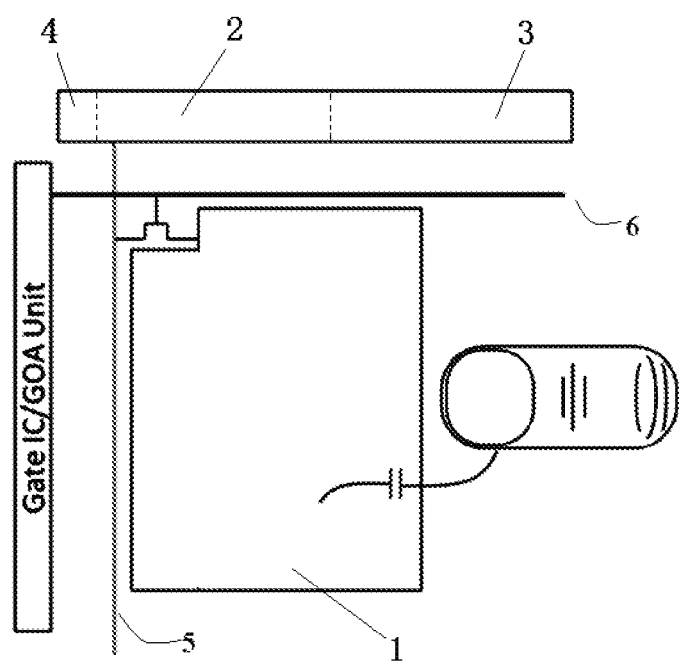

As shown in FIG. 7, optionally, the touch control display substrate may further include a memory 4. The memory 4 stores in advance therein the standard response times of the pixel electrodes when pixels corresponding to the pixel electrodes switch between grayscales corresponding to two adjacent frames of picture. It should be noted that, the touch control display substrate as shown in FIGS. 6 and 7 may include a plurality of gate lines (i.e., scan lines) 6 and a plurality of data lines (i.e., the display signal lines) 5 which cross each other, and a plurality of pixel electrodes 1 are located at cross points of the plurality of gate lines 6 and the plurality of data lines 5. FIGS. 6 and 7 only show one pixel electrode 1 as an example. The touch control display substrate as shown in FIGS. 6 and 7 may further include transistors (e.g., thin film transistors), a gate of one of the transistors being connected to a corresponding gate line 6, a source thereof being connected to a corresponding data line 5, and a drain thereof being connected to a corresponding pixel electrode 1. The touch control display substrate as shown in FIGS. 6 and 7 may further include a known Gate IC/GOA unit for implementing the functions required for a normal display. Further, FIGS. 6 and 7 each schematically illustrate a finger at the right sides thereof.

That is, the standard response times of the pixel electrodes when pixels corresponding to the pixel electrodes switch between grayscales corresponding to two adjacent frames of picture are stored in the IC in advance. During determination of touch control, charging the pixel electrodes to different data voltages requires different standard response times. In this case, a corresponding standard response time may be selected from the lookup table for performing comparison. Thus, an accuracy of the detection and an efficiency of the detection are increased.

Further, an embodiment of the present disclosure provides a touch control display panel, which includes the touch control display substrate according to any one of the foregoing embodiments.

Further, an embodiment of the present disclosure provides a display device, which includes the touch control display panel as described above. The display device may be any product or component having a display function, such as a liquid crystal display panel, electronic paper, a mobile phone, a tablet computer, a television set, a display, a laptop computer, a digital photo frame, a navigator, and the like.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A touch control display method, comprising steps of:
providing data voltages to pixel electrodes, respectively, by progressive scanning;
detecting actual response values of the pixel electrodes while the data voltages are provided to the pixel electrodes; and
comparing the actual response values with respective standard response values, to determine whether a touch has occurred,
wherein the actual response values comprise response times, and the standard response values comprise standard response times of the pixel electrodes when pixels corresponding to the pixel electrodes switch between grayscales corresponding to two adjacent frames of picture; and
the steps of detecting actual response values of the pixel electrodes and comparing the actual response values with respective standard response values comprise steps of: detecting a response time of any one of the pixel electrodes for being charged to a predetermined data voltage, comparing the response time with a corresponding standard response time, and determining a touch has occurred in a case where the response time is larger than the corresponding standard response time.

2. The touch control display method according to claim 1, wherein it is determined that a touch has occurred in a case where a difference between the response time and the corresponding standard response time is larger than a first threshold.

3. A touch control display method, comprising steps of:
providing data voltages to pixel electrodes, respectively, by progressive scanning;
detecting actual response values of the pixel electrodes while the data voltages are provided to the pixel electrodes; and
comparing the actual response values with respective standard response values, to determine whether a touch has occurred,
wherein the actual response values comprise response voltages to which the pixel electrodes are actually charged after being charged for a standard response time, and the standard response values comprise standard charged data voltages of the pixel electrodes; and
the steps of detecting actual response values of the pixel electrodes and comparing the actual response values with respective standard response values comprise steps of: detecting a response voltage of any one of the pixel electrodes after being charged for the standard response time, comparing the response voltage with a corresponding standard charged data voltage, and determining a touch has occurred in a case where the response voltage is less than the corresponding standard charged data voltage.

4. The touch control display method according to claim 3, wherein it is determined that a touch has occurred in a case where a difference between the corresponding standard charged data voltage and the response voltage is larger than a second threshold.

5. The touch control display method according to claim 1, wherein the step of providing data voltages to pixel electrodes, respectively, by progressive scanning comprises providing a same data voltage to all of the pixel electrodes.

6. The touch control display method according to claim 1, wherein the standard response time of the pixel electrodes when pixels corresponding to the pixel electrodes switch between grayscales corresponding to two adjacent frames of picture is obtained by looking up a table.

7. A touch control display substrate, comprising:
pixel electrodes;
a driver, configured to provide data voltages to the pixel electrodes, respectively, by progressive scanning;
a detector, configured to detect actual response values of the pixel electrodes while the driver provides the data voltages to the pixel electrodes, respectively, and compare the actual response values with respective standard response values to determine whether a touch has occurred,
wherein the actual response values comprise response times, and the standard response values comprise standard response times of the pixel electrodes when pixels corresponding to the pixel electrodes switch between grayscales corresponding to two adjacent frames of picture, and the detector is further configured to detect a response time of any one of the pixel electrodes for being charged to a predetermined data voltage, compare the response time with a corresponding standard response time, and determine a touch has occurred in a case where the response time is larger than the corresponding standard response time; or
wherein the actual response values comprise response voltages to which the pixel electrodes are actually charged after being charged for a standard response time, and the standard response values comprise standard charged data voltages of the pixel electrodes, and the detector is further configured to detect a response voltage of any one of the pixel electrodes after being charged for the standard response time, compare the response voltage with a corresponding standard charged data voltage, and determine a touch has occurred in a case where the response voltage is less than the corresponding standard charged data voltage.

8. The touch control display substrate according to claim 7, further comprising a memory storing in advance therein the standard response values of standard response times of the pixel electrodes when pixels corresponding to the pixel electrodes switch between grayscales corresponding to two adjacent frames of picture.

9. A touch control display panel, comprising the touch control display substrate according to claim 7.

10. A display device, comprising the touch control display panel according to claim 9.

11. The touch control display method according to claim 3, wherein the standard response time of the pixel electrodes when pixels corresponding to the pixel electrodes switch between grayscales corresponding to two adjacent frames of picture is obtained by looking up a table.

12. A touch control display panel, comprising the touch control display substrate according to claim 8.

13. A display device, comprising the touch control display panel according to claim 12.

* * * * *